K. SAWASAKI.
BICYCLE SEAT COVER.
APPLICATION FILED MAY 22, 1919.
1,322,959.
Patented Nov. 25, 1919.
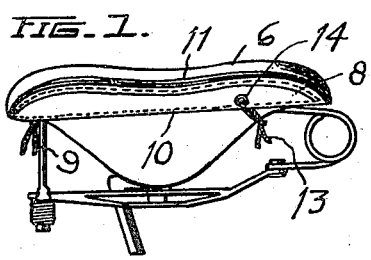
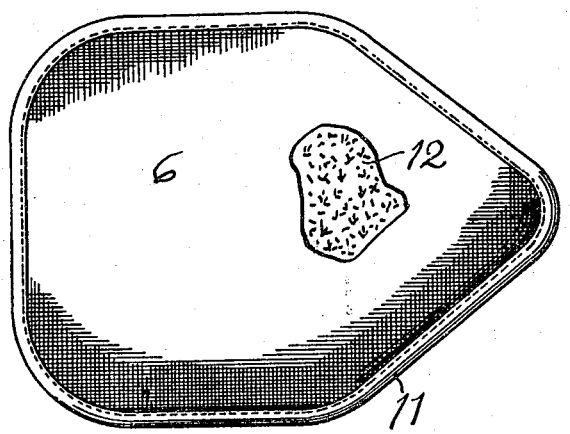
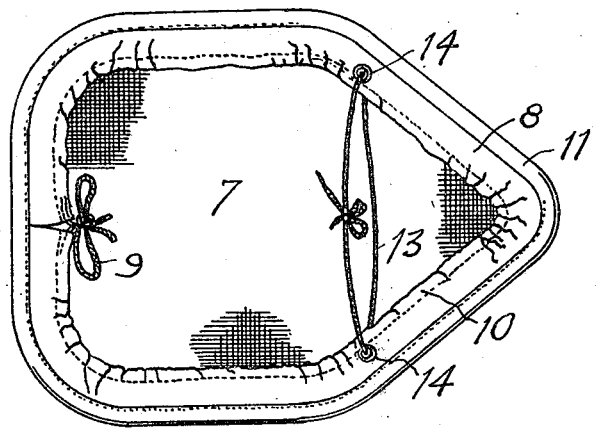
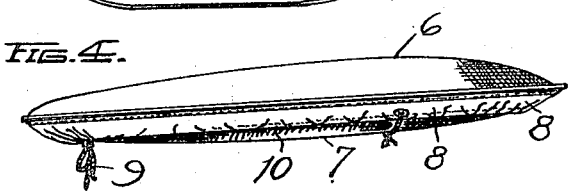
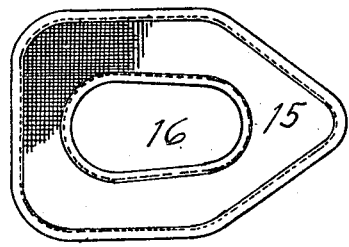
INVENTOR:
Kichinosuke Sawasaki.
By His Atty:
Edward M. Kojima

UNITED STATES PATENT OFFICE.

KICHINOSUKE SAWASAKI, OF EAST SAN PEDRO, CALIFORNIA.

BICYCLE-SEAT COVER.

1,322,959.

Specification of Letters Patent.

Patented Nov. 25, 1919.

Application filed May 22, 1919. Serial No. 298,921.

*To all whom it may concern:*

Be it known that I, KICHINOSUKE SAWASAKI, a subject of the Emperor of Japan, residing at East San Pedro, in the county of Los Angeles and State of California, have invented a new and useful Bicycle-Seat Cover, of which the following is a specification.

This invention relates to a cover for motor-cycle and bicycle seats, intended to serve as a cushion, and to reduce the wear on the clothes of the rider.

The object of the invention is to produce a device of this character, which may be quickly applied for use, and which will be inexpensive to construct.

Another object is to produce a cover for the bicycle seat which will serve to cushion the shock and jar occasioned by the motion of the bicycle over a rough path of travel.

The device as hereinafter described is susceptible of alterations and modifications to accord with the various styles and designs of bicycle seats and seats of similar character.

Upon the annexed drawings, Figure 1 is a side elevation of a bicycle seat with my improved cover applied thereto. Fig. 2 is a top plan view of the cover enlarged. Fig. 3 is a bottom plan view of the cover. Fig. 4 is a side elevation of the cover. Fig. 5 is a top plan view of a modified form of the cover.

Referring to the drawings, the cover consists of a top 6, preferably of felt fabric, a bottom 7, preferably of a tough cloth fabric, an inwardly extending lap 8 adapted to extend under the edges of the seat, a securing cord 9 passing through the looped edge 10, of the lap 8, and a trimming element 11, stitched to and uniting the edges of the top, bottom, and lap fabrics. A filler or padding 12 of any suitable material, is placed between the top and bottom fabrics, and produces the cushioning effect when the device is applied for use.

In use, the device is applied to the top of the seat of a bicycle, the lap 8 is forced under the edges of the seat, and the cord 9 is tightly drawn and the ends thereof are tied together. A cord 13 is passed through the eyelets 14, and passed under the nose or forward end of the seat, and when tightly drawn and the ends thereof tied, serves to make the cover conform to the seat.

By the above-described construction and combination of parts I provide a cover and protector, whereby the bicycle or motorcycle may be ridden with greater comfort, and may be manipulated by motion of the legs without occasioning discomfort by chafing, as well as decreasing the jar and vibration effect on the rider.

In the modified form shown in Fig. 5, the cover 15 is formed with the hollow center 16, the method of attachment being similar to that described for the preferred form of cover.

What is claimed is:

1. The seat cover as described, comprising a flexible pad, reinforced edges thereon conforming approximately with the contour of the seat, a lap element extending inwardly from the edges of the pad and adapted to extend under the edges of the seat, a looped edge on the lap element, and a securing cord passing through said looped edge.

2. A seat cover as described, comprising a top cloth fabric, a bottom cloth fabric, a filler of soft material interposed between the top and bottom fabrics, a lap element, a trimming element securing the top, bottom, and lap fabrics together, a looped edge on the lap element and projecting inwardly from the trimming element, a securing cord passing through the looped edge and adapted to have the ends thereof tied together, eyelets in the lap element, and a cord passing through the eyelets and adapted to pass under the nose of the seat.

3. The combination with a cover having top and bottom cloth fabric elements and a padding filler therebetween, of a lap extending inwardly from the edges of the cover, a folded edge on the lap, a securing cord passing through the folded edge, eyelets in the lap, and a second securing cord passing through the eyelets and adapted to be drawn tightly under the nose of the seat.

In testimony whereof, I hereunto affix my signature.

KICHINOSUKE SAWASAKI.